US007925753B2

(12) United States Patent
Inami et al.

(10) Patent No.: US 7,925,753 B2
(45) Date of Patent: Apr. 12, 2011

(54) STREAM DATA PROCESSING APPARATUS

(75) Inventors: Satoshi Inami, Osaka (JP); Shigenori Maeda, Osaka (JP); Akihiro Miyazaki, Aichi (JP); Tadashi Ono, Osaka (JP); Fukutaro Sekine, Tokyo (JP); Joerg Vogler, Hochheim (DE); Gerald Pfeiffer, Aschaffenburg (DE); Toshimasa Takaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 12/413,768

(22) Filed: Mar. 30, 2009

(65) Prior Publication Data
US 2009/0249038 A1    Oct. 1, 2009

Related U.S. Application Data

(63) Continuation-in-part of application No. 10/649,622, filed on Aug. 28, 2003, now abandoned.

(30) Foreign Application Priority Data

Aug. 30, 2002    (JP) .................................. 2002-254340

(51) Int. Cl.
  *G06F 15/173*    (2006.01)
  *G06F 15/16*    (2006.01)
(52) U.S. Cl. .................. 709/225; 709/246; 709/247
(58) Field of Classification Search .................. 709/225, 709/246–247
See application file for complete search history.

(56) References Cited

U.S. PATENT DOCUMENTS

| 4,893,340 | A | | 1/1990 | Lubarsky et al. | |
| 5,488,693 | A | | 1/1996 | Houck et al. | |
| 5,559,963 | A | | 9/1996 | Gregg et al. | |
| 5,745,906 | A | | 4/1998 | Squibb | |
| 5,832,215 | A | * | 11/1998 | Kato et al. | ..................... 709/230 |
| 6,044,438 | A | | 3/2000 | Olnowich | |
| 6,092,155 | A | * | 7/2000 | Olnowich | ..................... 711/142 |
| 6,122,674 | A | | 9/2000 | Olnowich | |
| 6,233,389 | B1 | | 5/2001 | Barton et al. | |

(Continued)

FOREIGN PATENT DOCUMENTS

CN    1428708 A    7/2003

(Continued)

OTHER PUBLICATIONS

Paul Sheer, Linux: Rute User's Tutorial and Exposition (Version 1.0.0), 2002, Section 18.4 Common Device Names, http://www.yiluda.net/manual/linux/rute/node21.html#SECTION002140000000000000000.

(Continued)

*Primary Examiner* — Hussein A Elchanti
(74) *Attorney, Agent, or Firm* — Wenderoth, Lind & Ponack, L.L.P.

(57) ABSTRACT

In a normal operation state, a connection management section writes data transmitted from a first processing section to a data temporary storage section and reads data to be received by a second processing section from the data temporary storage section. Upon receiving control signals which instruct a change of the subject of processing, the first processing section and the second processing section output a transmitting-end clear request and a receiving-end clear request, respectively. The connection management section reads data from the empty data storage section after a transmitting-end clear request is received and until a receiving-end clear request is received, and writes data to the empty data storage section after a receiving-end clear request is received and until a transmitting-end clear request is received.

11 Claims, 10 Drawing Sheets

U.S. PATENT DOCUMENTS 6,748,481 B1    6/2004    Parry et al.

FOREIGN PATENT DOCUMENTS

| JP | 2521016 | 5/1996 |
| JP | 3095290 | 8/2000 |

OTHER PUBLICATIONS

Office Action issued Mar. 6, 2007 in parent U.S. Appl. No. 10/649,622.

Office Action issued Aug. 20, 2007 in parent U.S. Appl. No. 10/649,622.

Office Action issued Dec. 6, 2007 in parent U.S. Appl. No. 10/649,622.

Office Action issued Apr. 17, 2008 in parent U.S. Appl. No. 10/649,622.

Office Action issued Oct. 29, 2008 in parent U.S. Appl. No. 10/649,622.

* cited by examiner

FIG. 12

| FROM FIRST PROCESSING SECTION \ FROM SECOND PROCESSING SECTION | YET TO RECEIVE RECEIVING-END CLEAR REQUEST | ALREADY RECEIVED RECEIVING-END CLEAR REQUEST |
|---|---|---|
| YET TO RECEIVE TRANSMITTING-END CLEAR REQUEST | ·WRITE DATA TO DATA TEMPORARY STORAGE SECTION<br>·READ DATA FROM DATA TEMPORARY STORAGE SECTION | ·WRITE DATA TO EMPTY DATA STORAGE SECTION<br>·READ DATA FROM DATA TEMPORARY STORAGE SECTION |
| ALREADY RECEIVED TRANSMITTING-END CLEAR REQUEST | ·WRITE DATA TO NEW DATA REGION IN DATA TEMPORARY STORAGE SECTION<br>·READ DATA FROM OLD DATA REGION IN DATA TEMPORARY STORAGE SECTION (OR FROM EMPTY DATA STORAGE SECTION IF THERE IS NO OLD DATA) | ·WRITE DATA TO DATA TEMPORARY STORAGE SECTION<br>·READ DATA FROM DATA TEMPORARY STORAGE SECTION |

STREAM DATA PROCESSING APPARATUS

This is a continuation-in-part application of Ser. No. 10/649,622, filed Aug. 28, 2003 now abandoned.

BACKGROUND OF THE INVENTION

1. Field of the Invention

The present invention relates to a stream data processing apparatus which performs multiple steps of processing for stream data. More particularly, the present invention relates to a stream data processing apparatus in which data is transmitted or received between a plurality of processing sections while achieving synchronization therebetween.

2. Description of the Related Art

Stream data processing apparatuses for performing multiple steps of processing stream data such as audio data or video data are known. A typical stream data processing apparatus comprises an input section, a processing section, and an output section, such that the processing section performs a predetermined process for inputted stream data, and outputs the processing results thus obtained. In many cases, a stream data processing apparatus performs a processing consisting of a plurality of steps for the inputted stream data. Accordingly, the stream data processing apparatus comprises a plurality of processing sections for executing the processes of the respective steps, and data is transmitted or received between such processing sections. Thus, the stream data processing apparatus executes multiple steps of processing in a pipeline manner for the inputted stream data. Sometimes instructions such as interruption of a process or a seek (i.e., commencing processing at a different position in a given stream of data which is being processed) may be given to the stream data processing apparatus. In order to ensure proper operation when receiving such instructions, the stream data processing apparatus performs exchange of data while achieving synchronization between the plurality of processing sections.

Japanese Patent No. 3095290 discloses a method, performed by a stream data processing apparatus, of exchanging data while achieving synchronization between a plurality of processing sections. According to this method, each processing section acquires via communications the state of another processing section with which it is exchanging data, and switches its own operation in accordance with the state of the other processing section. For example, when a seek instruction is given to the stream data processing apparatus, the processing section which is at the receiving end of data must postpone the receiving of data until the processing section at the transmitting end of data begins to transmit a processing result for the data corresponding to the new position. In order to realize such a function, each processing section controls its own operation so as not to read any improper data, in accordance with the content of the received data, the progress of the process, and the state of the other processing section. Thus, by properly exchanging data between a plurality of processing sections while achieving synchronization therebetween, the stream data processing apparatus can operate with a good overall integrity.

However, achieving synchronization between a plurality of processing sections using the above-described method has the following problems. Since each processing section needs to control its own operation in accordance with the data content, progress of the processing, and the state of another processing section, the structure of each processing section becomes complicated. When implementing each processing section in software, in particular, the structure of the software component constituting each processing section becomes complicated. Moreover, since a unified interface is not used between the respective processing sections in the above-described method, it is difficult to port the software component constituting each processing section into another system.

SUMMARY OF THE INVENTION

Therefore, an object of the present invention is to provide a stream data processing apparatus in which data is exchanged between a plurality of processing sections while achieving synchronization therebetween, such that each processing section is capable of performing the exchange of data without having to pay attention to the data content, progress of the processing, and the state of another processing section. Another object of the present invention is to unify the interface between the processing sections included in the stream data processing apparatus, thereby simplifying the structure of each processing section and improving the reusability of each processing section.

The stream data processing apparatus according to the present invention comprises a transmitting-end processing section, a receiving-end processing section, a control section, a data temporary storage section, an empty data storage section, and a connection management section, and performs multiple steps of processing for stream data. The transmitting-end processing section performs a process of one of the multiple steps of processing. The receiving-end processing section performs a process of a next one of the multiple steps of processing. The connection management section employs the data temporary storage section as a buffer for allowing the data transmitted from the transmitting-end processing section to be received by the receiving-end processing section. If it becomes necessary to change the subject of processing due to a seek or a change of the stream data, each processing section outputs a clear request to the connection management section in response to an instruction from the control section. The connection management section switches a write destination and a read source depending on whether the connection management section is in a normal operation state, a receiving-end clear wait state which exists after the transmitting-end clear request is received and until the receiving-end clear request is received, or a transmitting-end clear wait state which exists after the receiving-end clear request is received and until the transmitting-end clear request is received. As a destination for such switching, an empty data storage section, which erases any data written thereto in response to a data write and returns empty data in response to a data read, is used.

As a first example method of switching, the connection management section may select the empty data storage section as the read source in the receiving-end clear wait state, and select the empty data storage section as the write destination in the transmitting-end clear wait state. When this method of switching is adopted, the connection management section erases the data stored in the data temporary storage section if a clear request is received in the normal operation state.

As a second example method of switching, the connection management section may select the empty data storage section as the write destination in the transmitting-end clear wait state, and in the receiving-end clear wait state, regard as old data any data that is stored in the data temporary storage section when the transmitting-end clear request has been received, select as the write destination a region in the data temporary storage section where the old data is not stored, and select as the read source a region in the data temporary storage section where the old data is stored while the old data is present (and select the empty data storage section as the read source once the old data is no longer present). When this method of switching is adopted, the connection management section erases the data stored in the data temporary storage section if the receiving-end clear request is received in the normal operation state, and erase the old data if the receiving-end clear request is received in the receiving-end clear wait state.

The transmitting-end processing section and the receiving-end processing section may output the transmitting-end clear request and the receiving-end clear request and perform transmission and reception of data by using a data transmission/reception section which provides an accessing function to the connection management section.

The connection management section may be structured to be capable of selecting, if the data transmitted from the transmitting-end processing section cannot be written to the data temporary storage section, whether to perform a process of immediately notifying an error to the transmitting-end processing section or to perform a process of waiting until it becomes possible to write data to the data temporary storage section and notifying to the transmitting-end processing section a result of writing data to the data temporary storage section. Alternatively, the connection management section may be structured to be capable of selecting, if data to be received by the receiving-end processing section cannot be read from the data temporary storage section, a process of immediately notifying an error to the receiving-end processing section, or a process of waiting until it becomes possible to read data from the data temporary storage section and notifying to the receiving-end processing section a result of reading data from the data temporary storage section.

The stream data processing apparatus may further comprise a data input section via which to input the stream data, and/or a data output section for outputting a result of performing the multiple steps of processing the stream data. The data input section may input the stream data from a removable recording medium. The data output section may output the result of performing the multiple steps of processing to a removable recording medium.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a table illustrating the operation of the connection management section of the stream data processing apparatus according to the second embodiment of the present invention.

DETAILED DESCRIPTION OF THE INVENTION

First Embodiment

Figure 1:
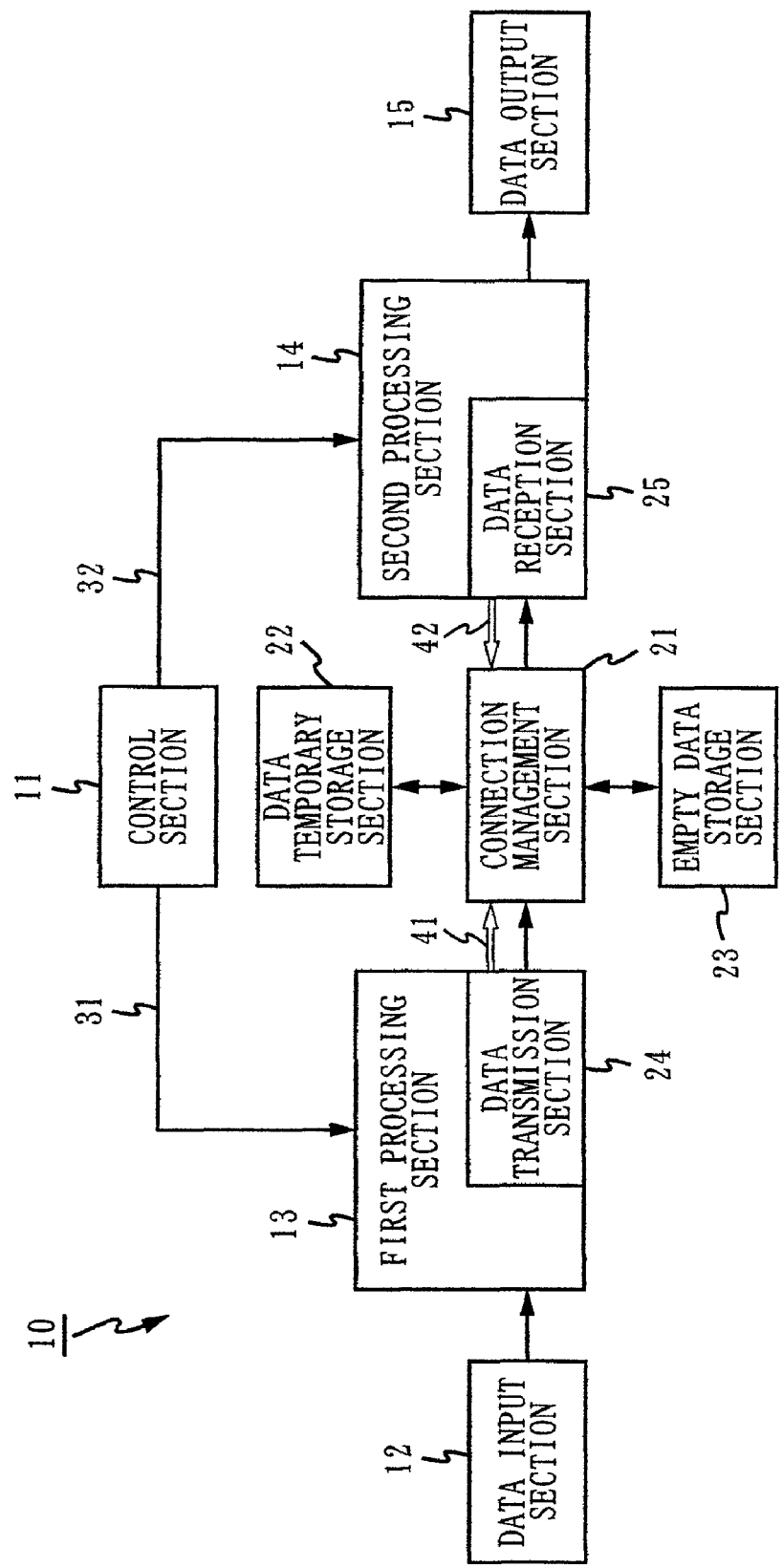
FIG. 1 is a block diagram illustrating the structure of a stream data processing apparatus according to first and second embodiments of the present invention.

FIG. 1 is a block diagram illustrating the structure of a stream data processing apparatus according to the first embodiment of the present invention. The stream data processing apparatus 10 shown in FIG. 1 comprises a control section 11, a data input section 12, a first processing section 13, a second processing section 14, a data output section 15, a connection management section 21, a data temporary storage section 22, an empty data storage section 23, a data transmission section 24, and a data reception section 25. The stream data processing apparatus 10 performs two steps of processing inputted stream data. As used herein, "stream data" refers to data which is inputted/outputted or processed in a chronological order, e.g., audio data or video data.

The control section 11 is a means for controlling the operation of the stream data processing apparatus 10. When a command is inputted from a user, or when an abnormality occurs in the apparatus, for example, the control section 11 outputs control signals 31 and 32, respectively, to the first processing section 13 and the second processing section 14.

The data input section 12 is a means by which to input stream data. The data input section 12 may be a storage device such as a hard disk drive or a memory, for example. The data input section 12, when composed of such a storage device, stores stream data in a predetermined format, and outputs the data contained in the stream data in a chronological order. Alternatively, the data input section 12 may be a communication controlling device which performs communications with, e.g., a server (not shown) which is coupled to data input section 12 via a network. The data input section 12, when composed of such a communication controlling device, receives the data contained in stream data in a chronological order via communications, and outputs the received data in the order in which they are received.

The first and second processing sections 13 and 14 perform two steps of processing the inputted stream data. More specifically, the first processing section 13 performs a first step of processing the data which has been inputted in a chronological order via the data input section 12, and transmits the processed data to the second processing section 14. The second processing section 14 receives the data which has been transmitted from the first processing section 13, and performs a second step of processing the received data. In the structure shown in FIG. 1, the first processing section 13 functions as a transmitting-end processing section, and the second processing section 14 functions as a receiving-end processing section.

The content of the processes performed by the first processing section 13 and the second processing section 14 may be arbitrary. Examples of the first processing section 13 and the second processing section 14 may be MPEG (Moving Pictures Experts Group) encoders, MPEG decoders, D/A converters for converting digital audio data to analog audio data, source filters used for obtaining data from a memory or the like, or renderer filters for adjusting the output timing of video signals.

The data output section 15 is an output means for outputting the processing result obtained by subjecting the inputted stream data to the two-step processing. The data output section 15 may be an output device such as a display device or a loudspeaker. Alternatively, the data output section 15 may be a storage device such as a hard disk drive or a memory. The data output section 15, when composed of such a storage device, stores the chronologically-outputted processing results in a predetermined format. Alternatively, the data output section 15 may be a communication controlling device which performs communications with, e.g., a server (not shown) which is coupled to the data output section 15 via a network. The data output section 15, when composed of such a communication controlling device, transmits via communications the aforementioned processing results in the order in which they are outputted.

The connection management section 21 utilizes the data temporary storage section 22 to allow the data which has been transmitted from the first processing section 13 to be received by the second processing section 14. More specifically, in response to a transmission request from the first processing section 13, the connection management section 21 writes to the data temporary storage section 22 the data transmitted from the first processing section 13. In response to a reception request from the second processing section 14, the connection management section 21 allows the second processing section 14 to receive the data which has been read from the data temporary storage section 22. The data temporary storage section 22 temporarily stores the data which has been transmitted from the first processing section 13. The data temporary storage section 22 may be composed of, for example, a storage device such as a hard disk drive or a memory. In order to ensure efficient management and storage of data, a buffer structure may be adopted for the data temporary storage section 22, e.g., queue, double buffer, or a ring buffer.

If it is impossible to write to the data temporary storage section 22 the data which has been transmitted from the first processing section 13 (e.g., if the data temporary storage section 22 is full), the connection management section 21 waits until it becomes possible to write data to the data temporary storage section 22, and notifies to the first processing section 13 a result of writing data to the temporary storage section 22. If it is impossible to read from the data temporary storage section 22 any data which is to be received by the second processing section 14 (e.g., if the data temporary storage section 22 is empty), the connection management section 21 waits until it becomes possible to read data from the data temporary storage section 22, and notifies to the second processing section 14 a result of reading data from the temporary storage section 22. In the stream data processing apparatus 10 comprising the connection management section 21 which operates in this manner, the processing by the first processing section 13 may be halted until completion of data transmission, or the processing by second processing section 14 may be halted until completion of data reception, depending on the state of the data temporary storage section 22. In such situations, the stream data processing apparatus 10 is said to be operating in a "blocking mode".

In the stream data processing apparatus 10, when accessing the connection management section 21, either the data transmission section 24 or the data reception section 25 is used. The data transmission section 24 provides a data transmission function, which is realized via the connection management section 21. The data reception section 25 provides a data reception function, which is realized via the connection management section 21. The data transmission function provided by the data transmission section 24 and the data reception function provided by the data reception section 25 are implemented by means of a unified interface. In the stream data processing apparatus 10, the first processing section 13 utilizes the data transmission section 24 when transmitting data to the second processing section 14 via the connection management section 21. The second processing section 14 utilizes the data reception section 25 when receiving data from the first processing section 13 via the connection management section 21.

Specific examples of the data transmission section 24 and the data reception section 25 will be described. For example, a case will be described where the stream data processing apparatus 10 is implemented as a multi-thread system which operates on a certain operating system (hereinafter referred to as "OS"). In this case, the stream data processing apparatus 10 is designed by utilizing an inter-thread communication function which is supported by the OS. Note that, by providing the designer of the stream data processing apparatus 10 with a system library for utilizing the functions of the OS, the designer of the stream data processing apparatus 10 can design threads which perform inter-thread communications by simply using the provided system library, without knowing the details of the operational principles of the OS. Referring to FIG. 1, the connection management section 21 would correspond to a portion of the OS that supports the inter-thread communication function, and the data transmission section 24 and the data reception section 25 would correspond to a portion of the system library that is related to the use of the inter-thread communication function. Thus, by utilizing the data transmission section 24 and the data reception section 25, the designer of the stream data processing apparatus 10 will be able to design the first processing section 13 and the second processing section 14 so as to be capable of performing data exchanges via the connection management section 21, without knowing the operational details of the connection management section 21.

In a normal operation state, the constituent elements of the stream data processing apparatus 10 operate as described above. Thus, the stream data processing apparatus 10 performs a two-step pipeline processing for the inputted stream data. For example, under the assumptions that the data input section 12 is a storage device which stores an MPEG video stream, the first processing section 13 is an MPEG video decoder, the second processing section 14 is a renderer filter, and the data output section 15 is a display device. According to this configuration the stream data processing apparatus 10 performs the process of decoding and displaying an MPEG video stream in two steps.

In the stream data processing apparatus 10, it may sometimes become necessary to change the subject of processing, for example, when a command is inputted from the user, or when an abnormality occurs within the apparatus. As used herein, a "change of the subject of processing" refers to a seek (i.e., commencing processing at a different position in a given stream of data which is being processed), or a change of stream data (i.e., commencing processing for a stream of data which is different from a given stream of data which is being processed), for example.

When it becomes necessary to change the subject of processing, the control section 11 outputs a control signal 31 for instructing a change of the subject of processing to the first processing section 13, and either simultaneously or slightly earlier or later than this, outputs a control signal 32 instructing the same to the second processing section 14. If the control signal 31 is received from the control section 11, the first processing section 13 outputs a transmitting-end clear request 41 to the connection management section 21 by using the data transmission section 24, in order to erase the data stored in the data temporary storage section 22. Similarly, if the control signal 32 is received from the control section 11, the second processing section 14 outputs a receiving-end clear request 42 to the connection management section 21 by using the data reception section 25.

Based on the transmitting-end clear request 41 or the receiving-end clear request 42, the connection management section 21 operates as follows. The connection management section 21 is in a normal operation state until receiving the transmitting-end clear request 41 or the receiving-end clear request 42. In a normal operation state, data which is transmitted from the first processing section 13 is written to the data temporary storage section 22, and data to be received by the second processing section 14 is read from the data temporary storage section 22. If a transmitting-end clear request 41 is received in a normal operation state, the connection management section 21 transitions to a receiving-end clear wait state, in which the data to be received by the second processing section 14 is read from the empty data storage section 23. If a receiving-end clear request 42 is received in a normal operation state, the connection management section 21 transitions to a transmitting-end clear wait state, in which the data which is transmitted from the first processing section 13 is written to the empty data storage section 23. If a receiving-end clear request 42 is received in a receiving-end clear wait state or if a transmitting-end clear request 41 is received in a transmitting-end clear wait state, the connection management section 21 transitions to a normal operation state. The details of the operation of the connection management section 21 will be described later (with reference to FIG. 4).

The empty data storage section 23 is a buffer which erases any data that is written thereto, and which returns empty data to any device which attempts to read data therefrom. In other words, any data that is written to the empty data storage section 23 will not be stored in the empty data storage section 23. Even if a data read from the empty data storage section 23 is attempted, only empty data can be read from the empty data storage section 23. A specific example of the empty data storage section 23 is a null device which is supported by some OS's. A null device, for example, is a device that returns an end of file in response to a request for data. Therefore, the empty data returned from the empty data storage section 23, could be, for example, data indicating an end of file.

Figure 2:
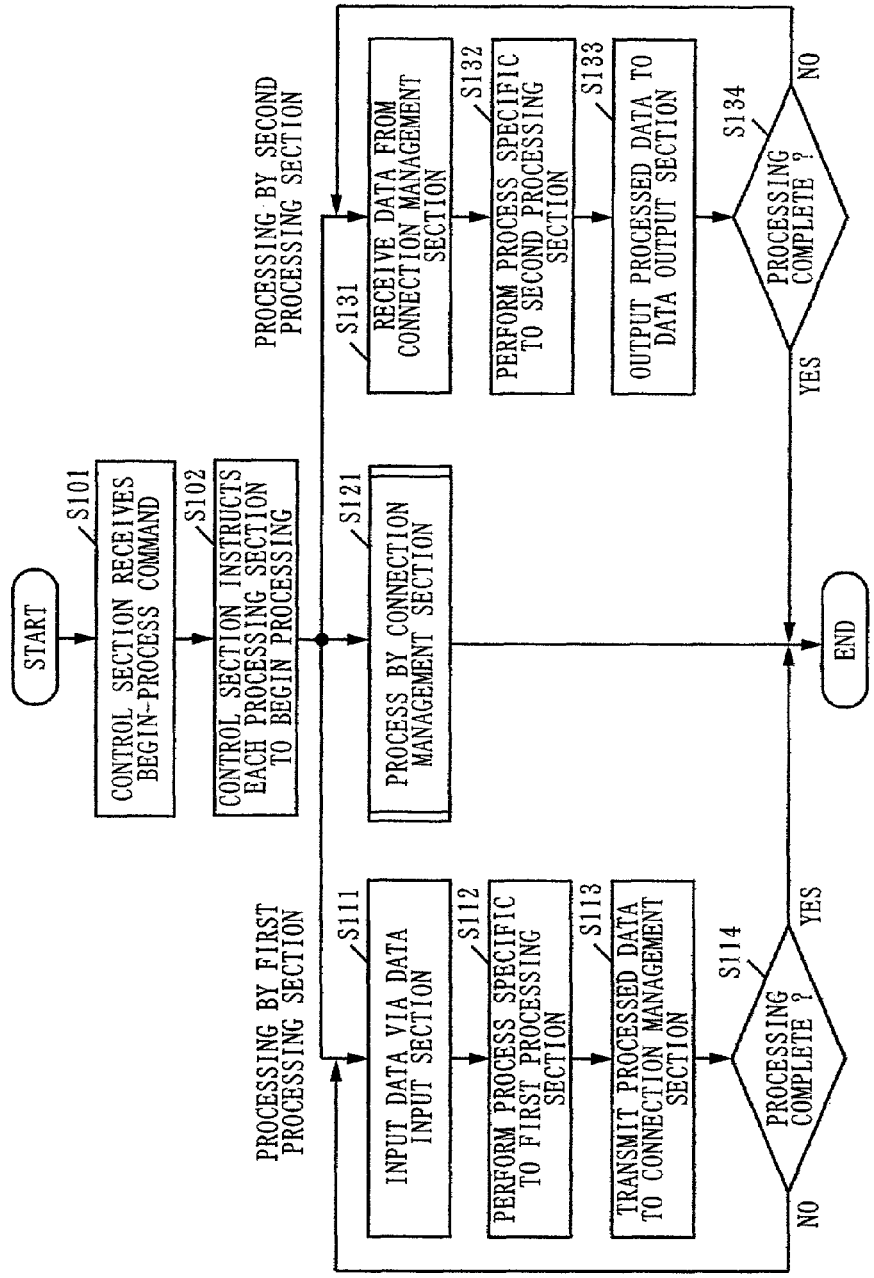
FIG. 2 is a flowchart illustrating the operation of the stream data processing apparatus according to the first and second embodiments of the present invention in the case where a commencement of processing is instructed in a processing stopped state.
Figure 3:
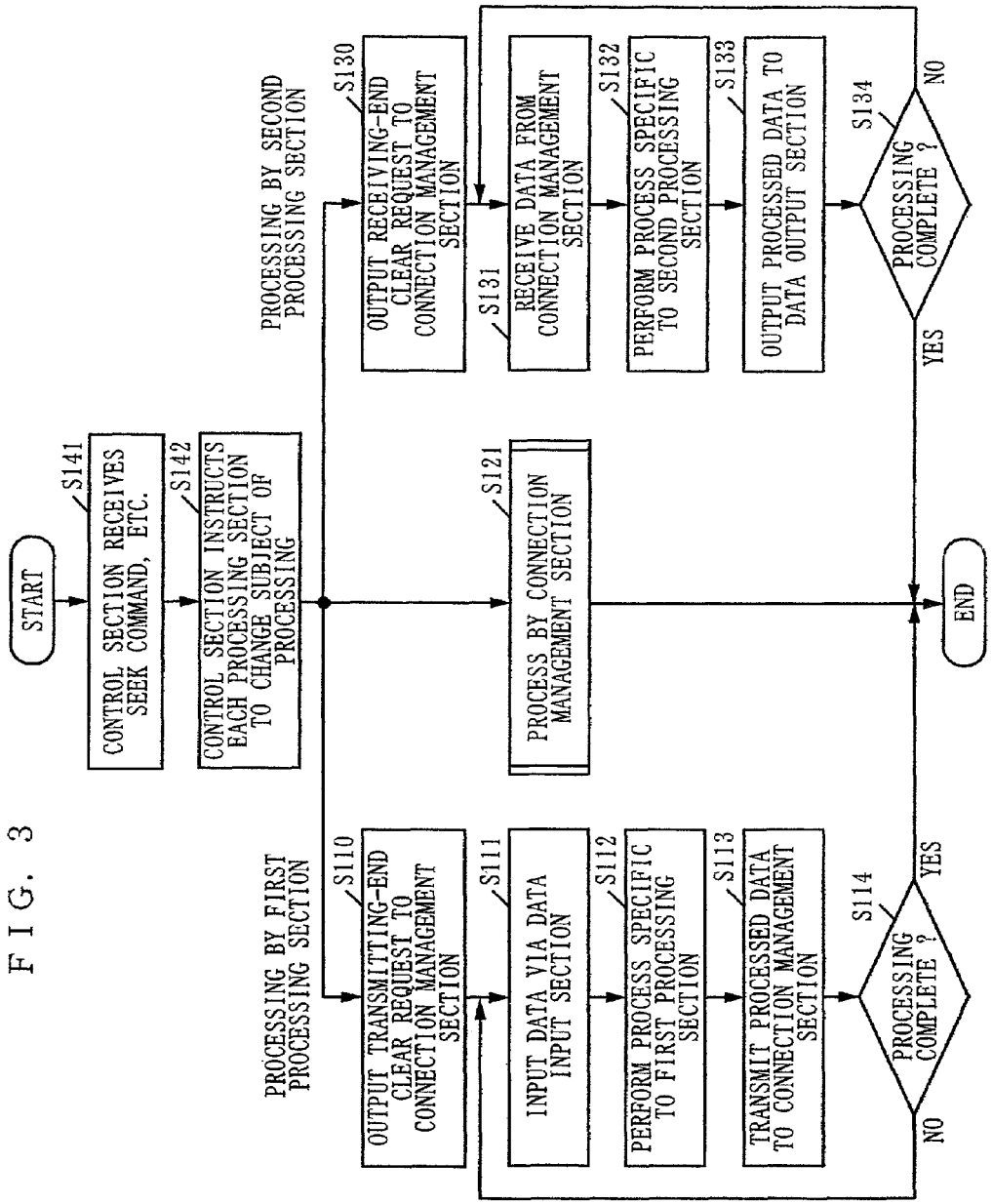
FIG. 3 is a flowchart illustrating the operation of the stream data processing apparatus according to the first and second embodiments of the present invention in the case where a change of the subject of processing is instructed in a normal operation state.
Figure 4:
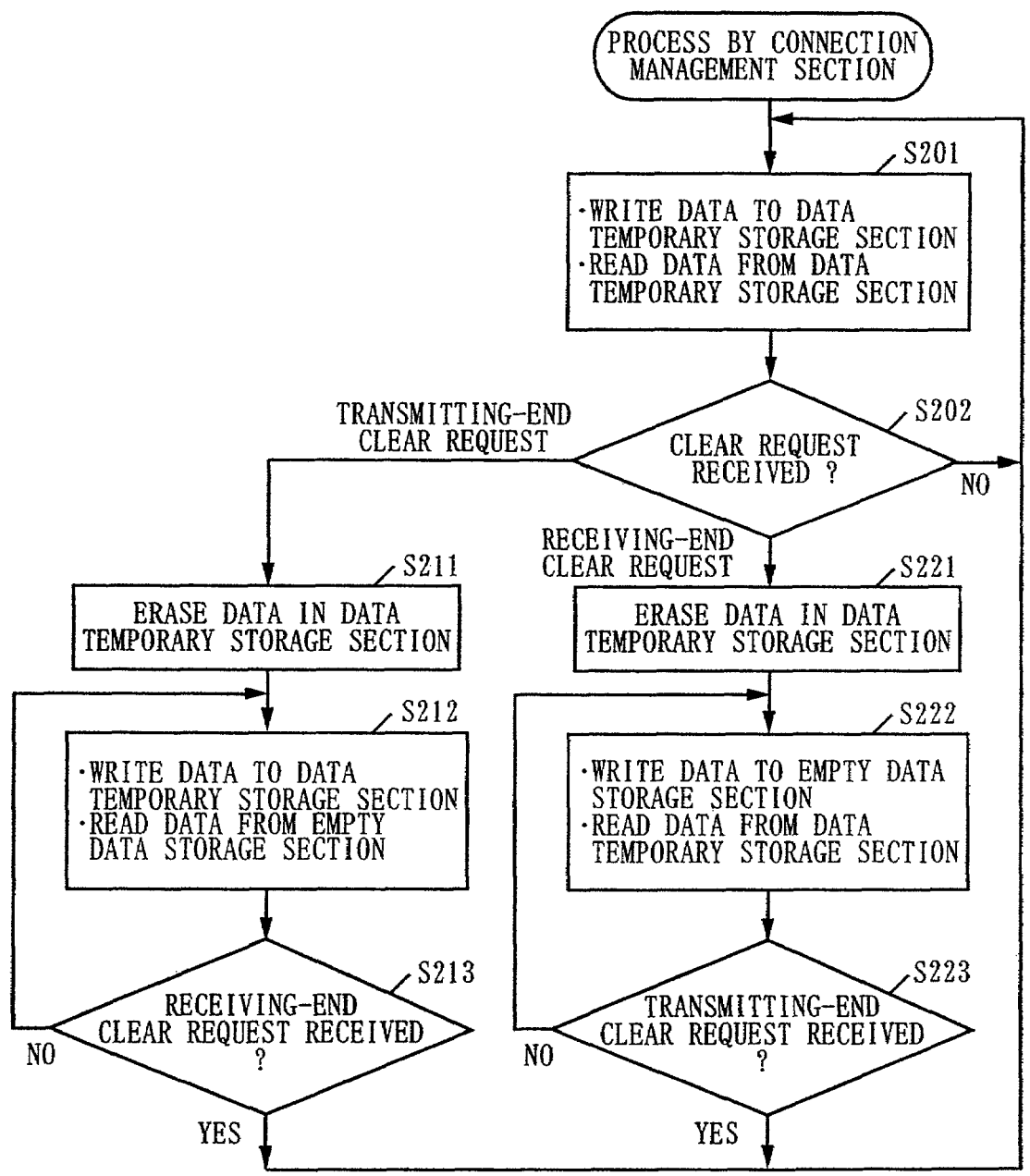
FIG. 4 is a flowchart illustrating the operation of a connection management section of the stream data processing apparatus according to the first embodiment of the present invention.

Hereinafter, referring to FIGS. 2 to 4, the details of the operation of the stream data processing apparatus 10 will be described. FIG. 2 is a flowchart illustrating the operation of the stream data processing apparatus in the case where a commencement of processing is instructed in a processing stopped state. FIG. 3 is a flowchart illustrating the operation of the stream data processing apparatus in the case where a change of the subject of processing is instructed in a normal operation state. FIG. 4 is a flowchart illustrating the operation of the connection management section 21.

If a commencement of processing is instructed in a processing stopped state, the stream data processing apparatus 10 performs the process shown in FIG. 2. The process shown in FIG. 2 is started when the user inputs a begin-process command to the stream data processing apparatus 10. If the user inputs a begin-process command, the control section 11 receives the inputted begin-process command (step S101). Next, the control section 11 outputs a control signal 31 which instructs a commencement of processing to the first processing section 13, and either simultaneously or slightly earlier or later than this, outputs a control signal 32 instructing the same to the second processing section 14 (step S102).

After step S102 is executed, the first processing section 13 executes steps S111 to S114, and the second processing section 14 executes steps S131 to S134. Also, the connection management section 21 performs a process shown in FIG. 4 (step S121) as described later, independently from the processes performed by the first processing section 13 and the second processing section 14. In other words, after step S102 is executed, the process by the first processing section 13, the process by the second processing section 14, and the process by the connection management section 21 are performed in parallel or concurrently in the stream data processing apparatus 10.

The first processing section 13 repeatedly executes steps S111 to S114 as described below until its processing for the stream data is completed. From the data input section 12, the first processing section 13 receives as an input the data contained in the stream data to be processed (step S111). Next, the first processing section 13 subjects the inputted data to a process which is specific to the first processing section 13 (step S112). Then, by using the data transmission section 24, the first processing section 13 transmits the processed data to the connection management section 21 (step S113). Then, the first processing section 13 determines whether its processing for the stream data has been completed or not (step S114). If it is determined that the processing is complete, the first processing section 13 stops processing. On the other hand, if it is determined that processing is incomplete, the first processing section 13 proceeds to step S111.

The second processing section 14 repeatedly executes steps S131 to S134 as described below until its processing for the stream data is completed. By using the data reception section 25, the second processing section 14 receives from the connection management section 21 the data which has been transmitted from the first processing section 13 (step S131). Next, the second processing section 14 subjects the received data to a process which is specific to the second processing section 14 (step S132). Then, the second processing section 14 outputs the processed data to the data output section 15 (step S133). Then, the second processing section 14 determines whether its processing for the stream data has been completed or not (step S134). If it is determined that the processing is complete, the second processing section 14 stops processing. On the other hand, if it is determined that processing is incomplete, the second processing section 14 proceeds to step S131.

If a change of the subject of processing is instructed in a normal operation state, the stream data processing apparatus 10 performs the process shown in FIG. 3. The process shown in FIG. 3 is started when the user inputs a seek command, a stream data change command, or the like. If the a seek command, a stream data change command, or the like is inputted by the user, the control section 11 receives the inputted command (step S141). Next, the control section 11 outputs a control signal 31 instructing a change of the subject of processing to the first processing section 13, and either simultaneously or slightly earlier or later than this, outputs a control signal 32 instructing the same to the second processing section 14 (step S142).

After step S142 is executed, the first processing section 13 outputs a transmitting-end clear request 41 to the connection management section 21 by using the data transmission section 24 (step S110), and the second processing section 14 outputs a receiving-end clear request 42 to the connection management section 21 by using the data reception section 25 (step S130). At this time, it depends on the structure or operational state of the stream data processing apparatus 10 which one of the transmitting-end clear request 41 and the receiving-end clear request 42 is outputted first.

After executing step S110, the first processing section 13 repeatedly executes steps S111 to S114 as in the case illustrated in FIG. 2. Also, after executing step S130, the second processing section 14 repeatedly executes steps S131 to S134, as in the case illustrated in FIG. 2. Henceforward, as in the case illustrated in FIG. 2, in the stream data processing apparatus 10, the process by the first processing section 13, the process by the second processing section 14, and the process by the connection management section 21 are performed in parallel or concurrently in the stream data processing apparatus 10.

As shown in FIG. 4, the connection management section 21 executes steps S201 and S202 in a normal operation state, executes steps S211 to S213 in a receiving-end clear wait state (i.e., a state which exists after a transmitting-end clear request 41 is received and until a receiving-end clear request 42 is received), and executes steps S221 to S223 in a transmitting-end clear wait state (i.e., a state which exists after a receiving-end clear request 42 is received and until a transmitting-end clear request 41 is received). In the following description, the data which is transmitted from the first processing section 13 will be referred to as "transmission data", and the data to be received by the second processing section 14 will be referred to as "data-to-be-received".

In a normal operation state, the connection management section 21 selects the data temporary storage section 22 both as a destination at which to write transmission data (hereinafter referred to as a "write destination for transmission data") and as a source from which to read the data-to-be-received (hereinafter referred to as a "read source of data-to-be-received"). Thus, in a normal operation state, the connection management section 21 writes transmission data to the data temporary storage section 22, and reads data-to-be-received from the data temporary storage section 22 (step S201). Next, the connection management section 21 determines whether a clear request has been received from the first processing section 13 or the second processing section 14 (step S202). If a transmitting-end clear request 41 has been received, the connection management section 21 proceeds to step S211; if a receiving-end clear request 42 has been received, the connection management section 21 proceeds to step S221; if neither clear request has been received, the connection management section 21 proceeds to step S201.

Figure 5:
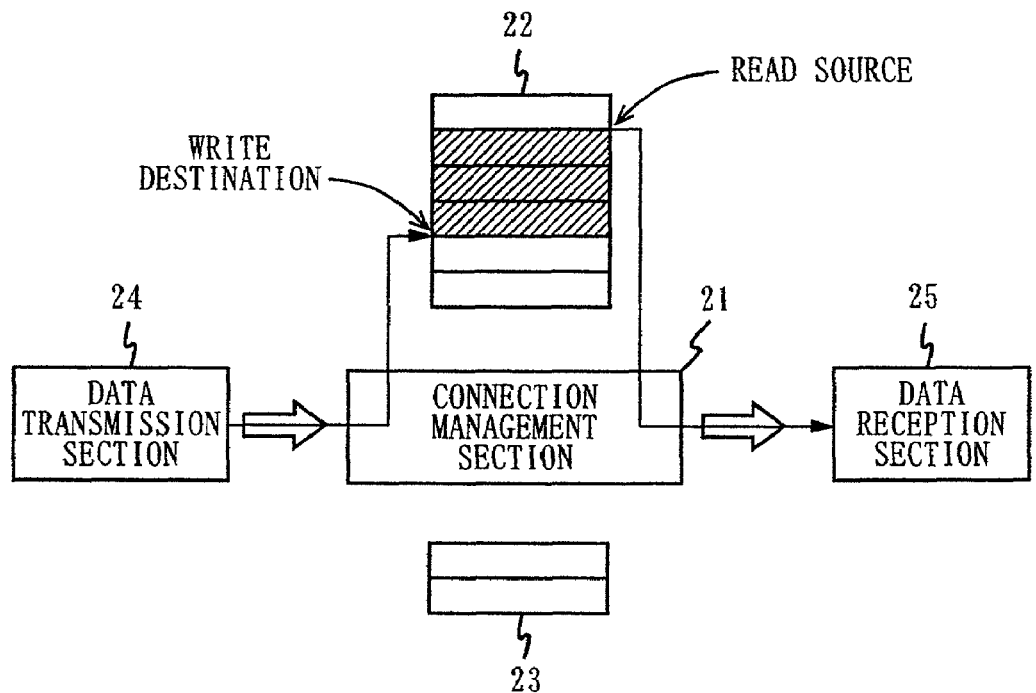
FIG. 5 is a diagram illustrating a manner in which data is transmitted or received in the stream data processing apparatus according to the first and second embodiments of the present invention in a normal operation state.

FIG. 5 is a diagram illustrating a manner in which data is transmitted or received at step S201. In FIG. 5, the write destination for transmission data and the read source of data-to-be-received are both set to be the data temporary storage section 22. The data temporary storage section 22 is illustrated as storing three pieces of data which have been transmitted from the first processing section 13 but not yet received by the second processing section 14.

Referring back to FIG. 4, if step S202 finds that a transmitting-end clear request 41 has been received, the connection management section 21 erases the data which is stored in the data temporary storage section 22 (step S211). Next, the connection management section 21 selects the empty data storage section 23 as the read source of data-to-be-received, while still selecting the data temporary storage section 22 as the write destination for transmission data. Thus, in a receiving-end clear wait state, the connection management section 21 writes transmission data to the data temporary storage section 22, and reads data-to-be-received from the empty data storage section 23 (step S212). Next, the connection management section 21 determines whether a receiving-end clear request 42 has been received from the second processing section 14 (step S213). If a receiving-end clear request 42 has been received, the connection management section 21 proceeds to step S201; otherwise, control proceeds to step S212.

Figure 6:
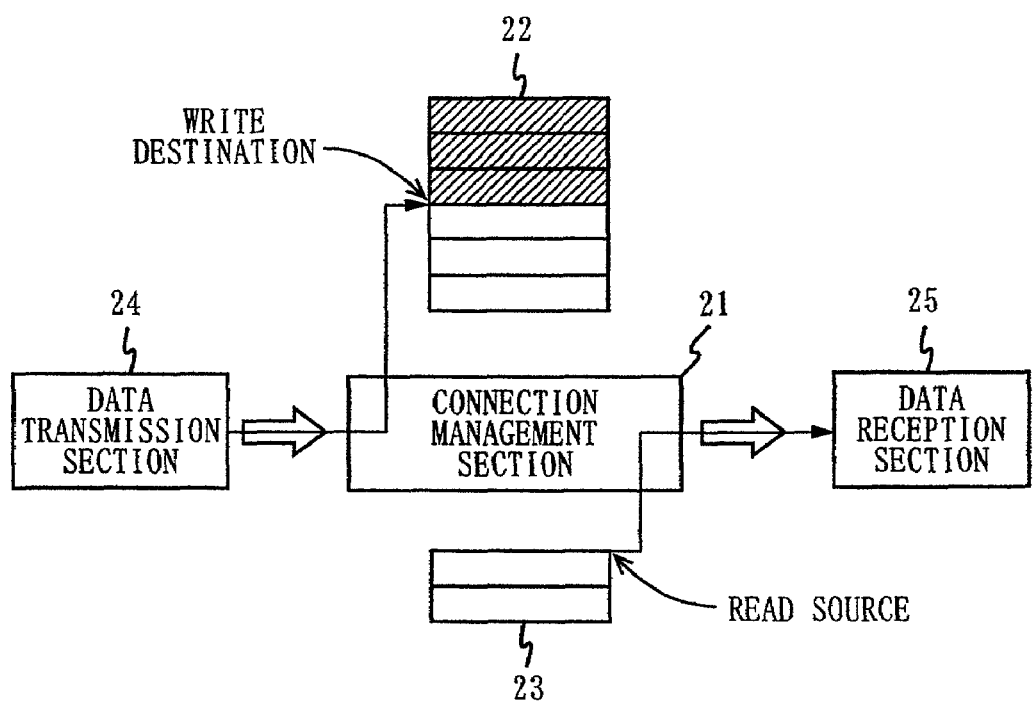
FIG. 6 is a diagram illustrating a manner in which data is transmitted or received in the stream data processing apparatus according to the first embodiment of the present invention in a receiving-end clear wait state.

FIG. 6 is a diagram illustrating a manner in which data is transmitted or received at step S212. In FIG. 6, the write destination for transmission data is set to be the data temporary storage section 22, whereas the read source of data-to-be-received is set to be the empty data storage section 23. Any data which is stored in the data temporary storage section 22 is once erased at step S211. In FIG. 6, the data temporary storage section 22 is illustrated as storing three pieces of data which were transmitted from the first processing section 13 after the data erasure but not yet received by the second processing section 14.

While the connection management section 21 is in a receiving-end clear wait state, the second processing section 14 will request the connection management section 21 to receive the rest of the data which the second processing section 14 was processing, despite the fact that the first processing section 13 has already changed its subject of processing. However, the "rest" of the data, which was stored in the data temporary storage section 22 while the connection management section 21 is in a normal operation state, has already been erased because the connection management section 21 has executed step S211. Moreover, while the connection management section 21 is in a receiving-end clear wait state, the first processing section 13 requests to the connection management section 21 that new data which emerged after the change of the subject of processing be transmitted, and so the connection management section 21 writes such transmission data to the data temporary storage section 22. Therefore, without providing a solution to this situation, the second processing section 14 would mistakenly receive the new data which emerged after the change of the subject of processing transmitted from the first processing section 13, and process such data as the rest of the data which the second processing section 14 was processing. As a solution to this problem, as described above, the connection management section 21 sets the read source of data-to-be-received to be the empty data storage section 23 in a receiving-end clear wait state. As a result, while the connection management section 21 is in a receiving-end clear wait state, the second processing section 14 is prevented from receiving anything but empty data. Thus, the aforementioned problem is solved so that the stream data processing apparatus 10 is prevented from malfunctioning.

Referring back to FIG. 4, if step S202 finds that a receiving-end clear request 42 has been received, the connection management section 21 erases the data stored in the data temporary storage section 22 (step S221). Next, the connection management section 21 selects the empty data storage section 23 as the write destination for transmission data, while still selecting the data temporary storage section 22 as the read source of data-to-be-received. Thus, in a transmitting-end clear wait state, the connection management section 21 writes transmission data to the empty data storage section 23, and reads data-to-be-received from the data temporary storage section 22 (step S222). Next, the connection management section 21 determines whether a transmitting-end clear request 41 has been received from the first processing section 13 (step S223). If a transmitting-end clear request 41 has been received, the connection management section 21 proceeds to step S201; otherwise, control proceeds to step S222.

Figures 7, 8:
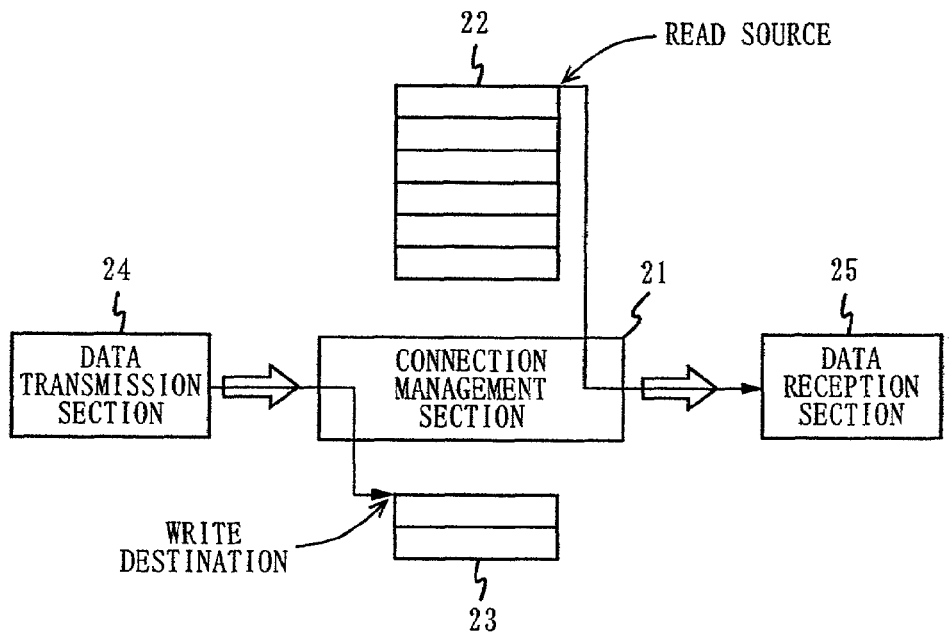
FIG. 7 is a diagram illustrating a manner in which data is transmitted or received in the stream data processing apparatus according to the first and second embodiments of the present invention in a transmitting-end clear wait state.
FIG. 8 is a table illustrating the operation of the connection management section of the stream data processing apparatus according to the first embodiment of the present invention.

FIG. 7 is a diagram illustrating a manner in which data is transmitted or received at step S222. In FIG. 7, the write destination for transmission data is set to be the empty data storage section 23, and the read source of data-to-be-received is set to be the data temporary storage section 22. Any data which is stored in the data temporary storage section 22 is erased at step S221, and any data which is transmitted from the first processing section 13 after the data erasure is written to the empty data storage section 23. As a result, in FIG. 7, the data temporary storage section 22 is illustrated as storing no data.

While the connection management section 21 is in a transmitting-end clear wait state, the first processing section 13 as the transmitting-end processing section will request that the rest of the data which the first processing section 13 was processing be transmitted, despite the fact that the second processing section 14 has already changed its subject of processing. However, the second processing section 14 requests the connection management section 21 to receive new data which emerged after the change of the subject of processing. Therefore, without providing a solution to this situation, the second processing section 14 would mistakenly receive the rest of the data which the first processing section 13 was processing and transmitted, and process such data as new data which emerged after the change of the subject of processing. As a solution to this problem, as described above, in a transmitting-end clear wait state, the connection management section 21 sets the write destination for transmission data to be the empty data storage section 23. As a result, while the connection management section 21 is in a transmitting-end clear wait state, the second processing section 14 is prevented from receiving anything but empty data. Thus, the aforementioned problem is solved so that the stream data processing apparatus 10 is prevented from malfunctioning.

FIG. 8 is a table illustrating the above-described operation (FIG. 4) of the connection management section 21. In the table of FIG. 8, the processes described in the upper left column and the lower right column are the processes to be performed in a normal operation state (step S201), the processes described in the lower left column are the processes to be performed in a receiving-end clear wait state (step S212), and the processes described in the upper right column are the processes to be performed in a transmitting-end clear wait state (step S222).

As described above, in accordance with the stream data processing apparatus of the present embodiment, in a normal operation state, the connection management section utilizes the data temporary storage section as a buffer for allowing the data transmitted from the first processing section (as the transmitting-end processing section) to be received by the second processing section (as the receiving-end processing section). If it becomes necessary to change the subject of processing due to a seek or change of stream data, etc., the first processing section and the second processing section output a transmitting-end clear request and a receiving-end clear request, respectively, in response to an instruction from the control section. When either type of clear request is received in a normal operation state, the connection management section erases any data stored in the data temporary storage section, and sets the read source of data-to-be-received to be the empty data storage section in a receiving-end clear wait state, and sets the write destination for transmission data to be the empty data storage section in a transmitting-end clear wait state.

Thus, when the subject of processing is changed, the second processing section is prevented from mistakenly receiving any new data which emerged after the change of the subject of processing and processing it as the rest of the data which the second processing section 14 was processing, or receiving the rest of the data which the first processing section was processing and processing such data as new data which emerged after the change of the subject of processing. Thus, by properly exchanging data between a plurality of processing sections while achieving synchronization therebetween, the stream data processing apparatus can operate with a good overall integrity.

Moreover, each processing section only needs to respond to an instruction of a change of the subject of processing from the control section by outputting a clear request; other than that, the processing section can continue to properly exchange data by requesting data transmission/reception. Thus, each processing section is capable of properly performing the exchange of data without having to pay attention to the data content or the state of another processing section with which data is exchange. As a result, the structure of each processing section can be simplified. In particular, in the case where each processing section is implemented in software, the software structure of each processing section can be simplified, thereby facilitating the design of the software components implementing the processing sections. A simpler software structure provides the advantage of reducing the amount of program code, which in turn makes for an improved software quality.

Moreover, each processing section exchanges data by using a data transmission provided by the data transmission section and a data reception function provided by the data reception section, which are implemented by means of a unified interface. As a result, the structure of each processing section is further simplified. In the case where each processing section is implemented in software, the software structure of each processing section can be even more simplified, and the reusability of each processing section is enhanced. Thus, in the case where each processing section is implemented in software, it is made easier to port the software component constituting each processing section into another system.

Second Embodiment

The stream data processing apparatus according to the first embodiment of the present invention is illustrated as erasing any data stored in the data temporary storage section when a transmitting-end clear request or a receiving-end clear request is outputted in a normal operation state. On the other hand, a stream data processing apparatus according to the second embodiment of the present invention is characterized in that, if a transmitting-end clear request is outputted first in a normal operation state, any data stored in the data temporary storage section is not erased, and in a receiving-end clear wait state, both new data and old data are stored in the data temporary storage section, in such a manner that the new data is distinguishable from the old data.

The stream data processing apparatus of the present embodiment has the same structure as that of the stream data processing apparatus of the first embodiment (as illustrated in FIG. 1), and performs the same processes as those performed by the stream data processing apparatus of the first embodiment in the case where a commencement of processing is instructed in a processing stopped state (FIG. 2) or a change of the subject of processing is instructed in a normal operation state (FIG. 3). Therefore, any description of these aspects will be omitted in the present embodiment. The stream data processing apparatus of the present embodiment differs from the stream data processing apparatus of the first embodiment with respect to the operation of the connection management section 21 in a receiving-end clear wait state.

Figure 9:
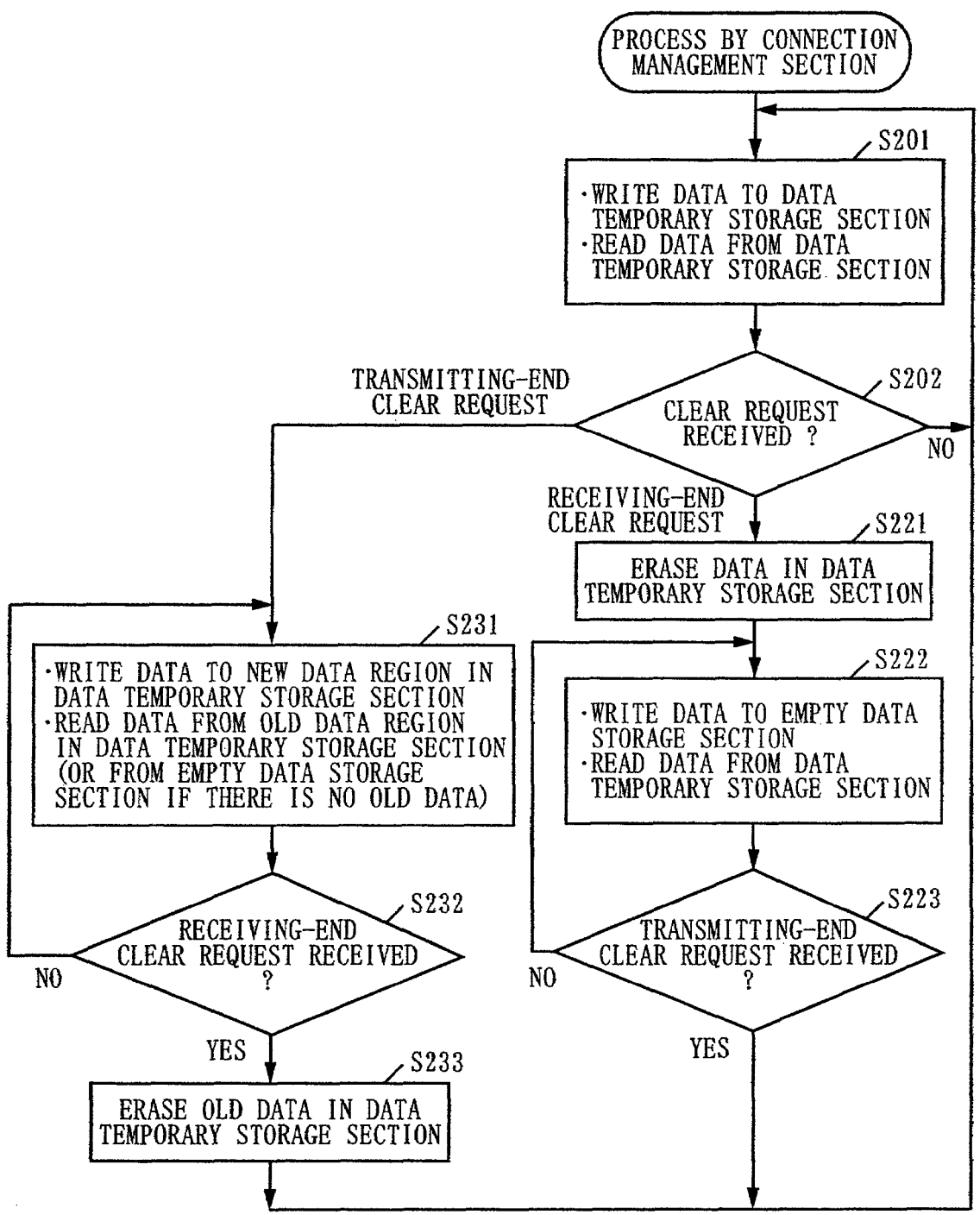
FIG. 9 is a flowchart illustrating the operation of a connection management section of the stream data processing apparatus according to the second embodiment of the present invention.

FIG. 9 is a flowchart illustrating the operation of the connection management section 21 of the stream data processing apparatus according to the second embodiment of the present invention. As shown in FIG. 9, the connection management section 21 executes steps S201 and S202 in a normal operation state, executes steps S231 to S233 in a receiving-end clear wait state, and executes steps S221 to S223 in a transmitting-end clear wait state. Since the process performed in a normal operation state and the process performed in a transmitting-end clear wait state are the same as those performed by the stream data processing apparatus of the first embodiment, the descriptions thereof are omitted (see FIG. 4) In the following description, any data which is stored in the data temporary storage section 22 when a transmitting-end clear request 41 has been outputted will be referred to as "old data", whereas any data which is transmitted from the first processing section 13 while the connection management section 21 is in a receiving-end clear wait state will be referred to as "new data". A region in the data temporary storage section 22 in which old data is stored will be referred to as an "old data region", whereas a region in the data temporary storage section 22 in which no old data is stored will be referred to as a "new data region".

As shown in FIG. 9, when step S202 finds that a transmitting-end clear request 41 has been received, the connection management section 21 proceeds to step S231 without erasing the old data. In this case, the connection management section 21 selects the new data region as the write destination for transmission data, and selects the old data region as the read source of data-to-be-received. Note, however, that the old data region is selected as the read source of data-to-be-received only if there is any unread old data. Once old data is no longer present, the empty data storage section 23 is selected as the read source of data-to-be-received. Thus, in a receiving-end clear wait state, the connection management section 21 writes transmission data in the new data region, and reads data-to-be-received from the old data region (or from the empty data storage section 23 if no old data is present) (step S231).

Next, the connection management section 21 determines whether a receiving-end clear request 42 has been received from the second processing section 14 (step S232). If a receiving-end clear request 42 has been received, the connection management section 21 proceeds to step S233; otherwise, control proceeds to step S231. At step S233, the connection management section 21 erases any old data present (step S233), and thereafter proceeds to step S201.

Figure 10:
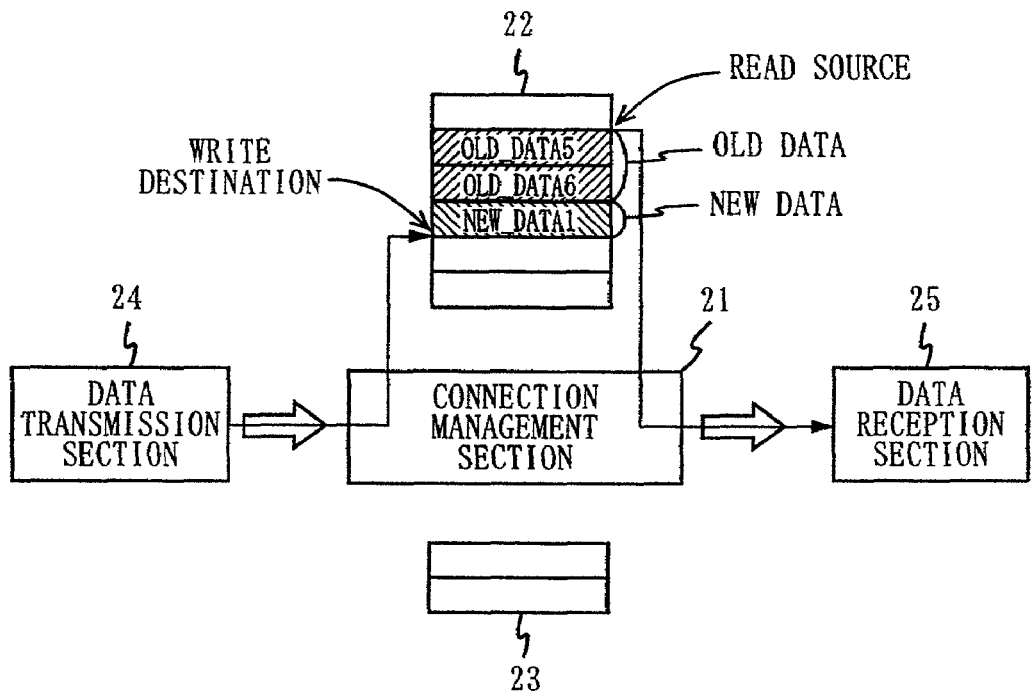
FIG. 10 is a diagram illustrating a manner in which data is transmitted or received in the stream data processing apparatus according to the second embodiment of the present invention in a receiving-end clear wait state, in the case where old data is present.
Figure 11:
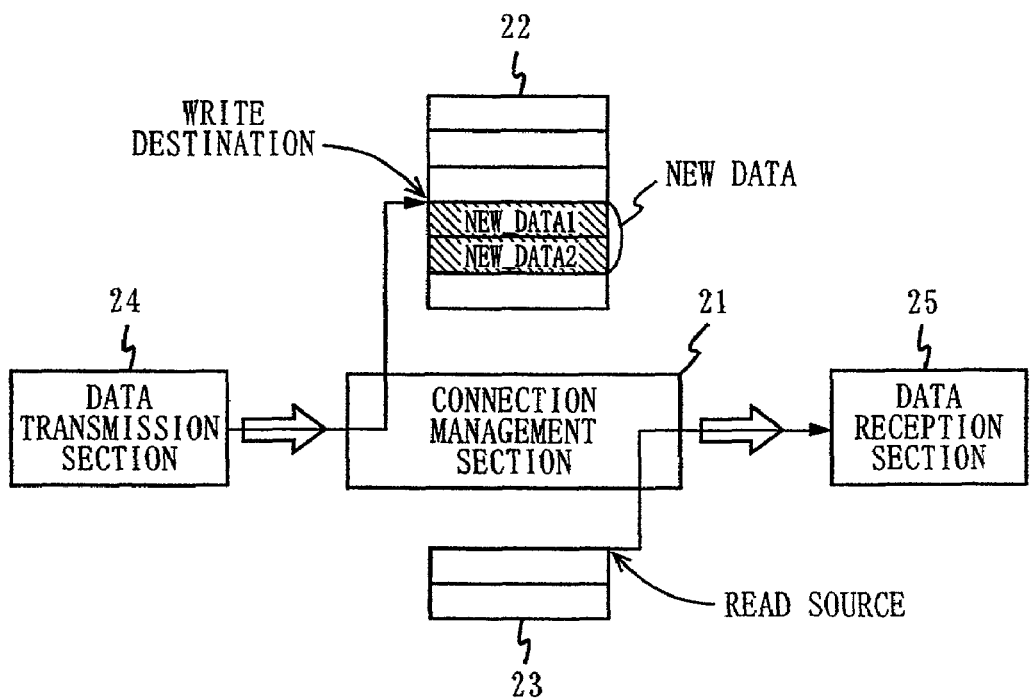
FIG. 11 is a diagram illustrating a manner in which data is transmitted or received in the stream data processing apparatus according to the second embodiment of the present invention in a receiving-end clear wait state, in the case where old data is no longer present.

FIGS. 10 and 11 are diagrams illustrating manners in which data is transmitted or received at step S231. FIG. 10 illustrates the case where old data is present. In FIG. 10, the data temporary storage section 22 is illustrated as storing two pieces of old data (OLD_DATA5 and OLD_DATA6) and one piece of new data (NEW_DATA1), these two kinds of data being stored so as to be distinguishable from each other. If the first processing section 13 requests transmission of a next piece of new data in the state as shown in FIG. 10, the connection management section 21 writes such data to the new data region in the data temporary storage section 22 (e.g., in the next slot to the new data NEW_DATA1). If the second processing section 14 requests receiving a next piece of old data (OLD_DATA5) in the state as shown in FIG. 10, the connection management section 21 reads such data from the old data region in the data temporary storage section 22, and transmits it to the second processing section 14.

FIG. 11 illustrates the case where old data is no longer present. If the second processing section 14 requests receiving two pieces of old data and the first processing section 13 requests transmission of one new piece of data in the state shown in FIG. 10, a state shown as in FIG. 11 results. In FIG. 11, the data temporary storage section 22 is illustrated as storing two pieces of new data (NEW_DATA1 and NEW_DATA2). If the first processing section 13 requests transmission of a next piece of new data in the state shown in FIG. 11, the connection management section 21 writes such data to the new data region in the data temporary storage section 22 (e.g., in the next slot to the new data NEW_DATA2). If the second processing section 14 requests receiving a next piece of old data in the state shown in FIG. 11, the connection management section 21 reads empty data from the empty data storage section 23. Since the stream data processing apparatus 10 operates in a blocking mode, the processing by the second processing section 14 will be halted until the completion of data reception.

As in the first embodiment, while the connection management section 21 is in a receiving-end clear wait state, the second processing section 14 will request receiving old data, despite the fact that the first processing section 13 has already changed its subject of processing. Remember that in the first embodiment, the connection management section 21 executes step S211, so that old data would already have been erased. However in the present embodiment, the old data has not been erased at this point. Moreover, in a receiving-end clear wait state, the connection management section 21 writes transmission data as new data to the data temporary storage section 22, and reads as data-to-be-received the old data stored in the data temporary storage section 22. As a result, while the connection management section 21 is in a receiving-end clear wait state, the second processing section 14 can receive the old data, if any, but is prevented from receiving anything but empty data once old data is no longer present. Thus, the second processing section 14 can properly receive the old data stored in the data temporary storage section 22 and process it as the rest of the data which the second processing section 14 was processing.

FIG. 12 is a table illustrating the above-described operation (FIG. 9) of the connection management section 21. In the table of FIG. 12, the processes described in the upper left column and the lower right column are the processes to be performed in a normal operation state (step S201), the processes described in the lower left column are the processes to be performed in a receiving-end clear wait state (step S231), and the processes described in the upper right column are the processes to be performed in a transmitting-end clear wait state (step S222).

As described above, in accordance with the stream data processing apparatus of the present embodiment, in a normal operation state or in a transmitting-end clear wait state, the connection management section performs the same operation as that performed by the stream data processing apparatus of the first embodiment. On the other hand, in a receiving-end clear wait state, the connection management section regards any data stored in the data temporary storage section when a transmitting-end clear request has been received, and sets the write destination for transmission data to be the new data region in the data temporary storage section, and sets the read source of data-to-be-received to be the old data region in the data temporary storage section (or the empty data storage section once old data is no longer present).

Therefore, the stream data processing apparatus of the present embodiment provides, in addition to the advantages provided by the stream data processing apparatus of the first embodiment, an advantage in that the second processing section can properly perform processing to the old data stored in the data temporary storage section after a transmitting-end clear request is outputted and until a receiving-end clear request is outputted.

Various variants of the stream data processing apparatus according to each embodiment of the present invention are possible, such as follows.

The stream data processing apparatus of each embodiment as described above is illustrated as comprising two processing sections which perform two-step processing for inputted stream data. Alternatively, the stream data processing apparatus may comprise three or more processing sections to perform three or more steps of processing for inputted stream data. In this case, the stream data processing apparatus may realize data exchanges via the connection management section between any and all processing sections.

Figure 13:
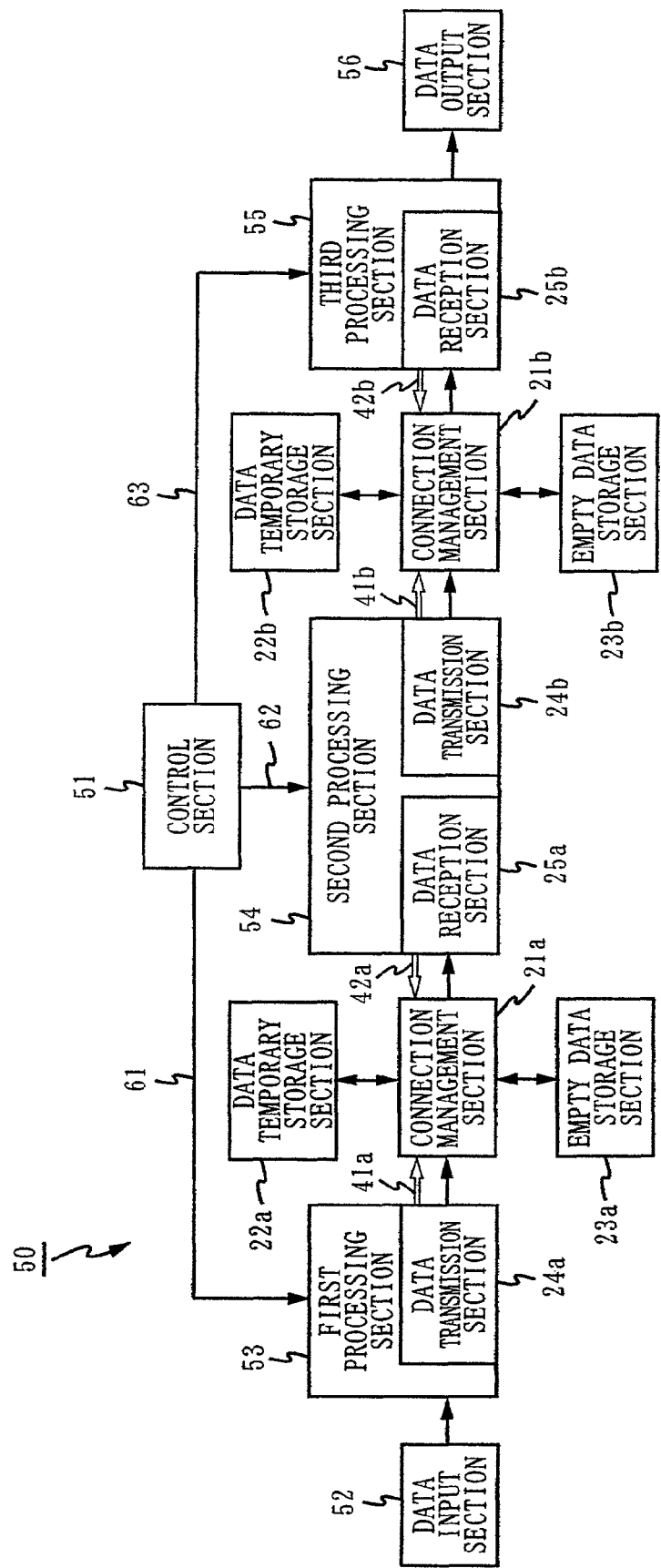
FIG. 13 is a block diagram illustrating the structure of a stream data processing apparatus according to a variant of the present invention.

FIG. 13 illustrates a variant stream data processing apparatus which performs three-step processing for inputted stream data. A stream data processing apparatus 50 shown in FIG. 13 comprises a first processing section 53, a second processing section 54, and a third processing section 55 to perform three steps of processing the stream data which is inputted via the data input section 52, and outputs the processing result from the data output section 56. When a seek command or the like is inputted from the user, the control section 51 outputs control signals 61, 62, and 63 to the first processing section 53, the second processing section 54, and the third processing section 55, respectively. The first processing section 53 employs a data transmission section 24a to transmit data to the second processing section 54. The second processing section 54 employs a data reception section 25a to receive data from the first processing section 53. Based on a transmitting-end clear request 41a and a receiving-end clear request 42a, the connection management section 21a performs data write and data read for the data temporary storage section 22a and the empty data storage section 23a, thereby allowing data which is transmitted from the first processing section 53 to be received by the second processing section 54. The data exchange between the second processing section 54 and the third processing section 55 is handled in a similar manner.

A stream data processing apparatus comprising three or more processing sections does not need to realize data exchanges via the connection management section between any and all processing sections. Instead, data exchanges via the connection management section may be realized only between some of the processing sections. For example, in the stream data processing apparatus 50 shown in FIG. 13, data exchanges via the connection management section may be performed between the first processing section 53 and the second processing section 54 while data exchanges which do not involve the connection management section may be performed between the second processing section 54 and the third processing section 55.

Although the stream data processing apparatus of each embodiment above is illustrated as operating in a blocking mode, the stream data processing apparatus may operate in a non-blocking mode as described below. Further alternatively, the stream data processing apparatus may be structured so as to be able to select between a blocking mode operation and a non-blocking mode operation. In that case, the processing performed by each processing section can be arbitrarily controlled, depending on the operational state of the apparatus or the like, so that the processing performed by each processing section is halted or not halted in a data reception/transmission wait state.

In a stream data processing apparatus operating in a non-blocking mode, if transmission data cannot be written to the data temporary storage section, or if data-to-be-received cannot be read from the data temporary storage section, the connection management section immediately notifies an error to the processing section from which the transmission data originated or the processing section for which the data-to-be-received is intended. In this case, after requesting a data transmission or reception via the connection management section, each processing section waits until the data transmission or reception is complete, by performing data processes such as poll or select. Therefore, even if another event occurs during the waiting, the processing section can immediately perform a process related to that event. For example, if the user instructs an interruption of processing to the control section during the waiting, the processing section can immediately stop processing in response to the processing interruption instruction which has been outputted from the control section. Thus, each processing section can perform a process related to another event even in a data transmission/reception wait state. As a result, when an instruction is inputted from the user, the stream data processing apparatus can promptly respond to the user's instruction, without having to newly activate a thread for responding to the instruction.

In the above embodiments, it is stated that the data input section 12 and/or the data output section 15 may be a storage device such as a hard disk or a memory. More specifically, the data input section 12 and/or the data output section 15 may be constructed so as to write data to or read data from a removable recording medium such as a memory card. In accordance with a stream data processing apparatus comprising such a data input section 12 and such a data output section 15, it becomes possible to store the processing result obtained with a first apparatus to the removable recording medium, remove the recording medium from the first apparatus, and mount the recording medium to a second apparatus. In this manner, the second apparatus is enabled to continue from the processing by the first apparatus to reproduce stream data, perform a seek, or the like.

The stream data processing apparatus according to the present invention enables data transmission or reception between processing sections in such a manner that one processing section does not need to pay attention to the state of the other processing section. Thus, the stream data processing apparatus according to the present invention can be utilized as a device for processing stream data, e.g., reproduction device of audio data or video data.

While the invention has been described in detail, the foregoing description is in all aspects illustrative and not restrictive. It is understood that numerous other modifications and variations can be devised without departing from the scope of the invention.

The invention claimed is:

1. A stream data processing apparatus for performing multiple processing steps during a processing of stream data, said stream data processing apparatus comprising:

a transmitting-end processing section for performing a processing step, of one of said multiple processing steps, of processing data contained in the stream data, and transmitting the processed data;

a receiving-end processing section for receiving the processed data transmitted from said transmitting-end processing section, for receiving empty data, and for performing another processing step, of a next one of said multiple processing steps, of processing the received data;

a control section for transmitting a change signal to instruct a change of a subject of processing, the change signal being transmitted to said transmitting-end processing section and to said receiving-end processing section;

a data temporary storage section including a physical memory for temporarily storing the processed data transmitted from said transmitting-end processing section;

an empty data storage section for erasing any data written thereto in response to a data write, and for returning empty data in response to a data read, such that the empty data is a packet having a payload of 0 bytes and indicates an end of file; and a connection management section for (i) allowing the processed data transmitted from said transmitting-end processing section to be received by said receiving-end processing section, via said data temporary storage section, by performing a data write to and a data read from said data temporary storage section, and (ii) allowing empty data to be received by said receiving-end processing section, via said empty data storage section, by performing the data write to and the data read from said empty data storage section, wherein:

said control section, said transmitting-end processing section, said receiving-end processing section, and said connection management section are interconnected and configured such that, if a change signal is transmitted from said control section (i) to said transmitting-end processing section, said transmitting-end processing section is operable to output a transmitting-end clear request to said connection management section, and (ii) to said receiving-end processing section, said receiving-end processing section is operable to output a receiving-end clear request to said connection management section;

said connection management section is operable to (i) switch a write destination of the processed data transmitted from said transmitting-end processing section, the write destination being switched between said data temporary storage section and said empty data storage section, and (ii) switch a read source of any data, including the processed data and empty data, received by said receiving-end processing section, the read source being switched between said data temporary storage section and said empty data storage section;

the switching of the write destination and the switching of the read source being executed by said connection management section based on whether said connection management section is in (i) a normal operation state, (ii) a receiving-end clear wait state which exists after the transmitting-end clear request is received by said connection management section and until the receiving-end clear request is received by said connection management section, or (iii) a transmitting-end clear wait state which exists after the receiving-end clear request is received by said connection management section and until the transmitting-end clear request is received by said connection management section.

2. The stream data processing apparatus according to claim 1, wherein said connection management section is operable to:

select said data temporary storage section as the write destination and the read source when said connection management section is in the normal operation state;

erase the processed data stored in said data temporary storage section if the transmitting-end clear request or the receiving-end clear request is received when said connection management section is in the normal operation state;

select said empty data storage section as the read source when said connection management section is in the receiving-end clear wait state; and select said empty data storage section as the write destination when said connection management section is in the transmitting-end clear wait state.

3. The stream data processing apparatus according to claim 1, wherein said connection management section is operable to:

select said data temporary storage section as the write destination and the read source when said connection management section is in the normal operation state;

erase the processed data stored in said data temporary storage section if the receiving-end clear request is received when said connection management section is in the normal operation state;

select said empty data storage section as the write destination when said connection management section is in the transmitting-end clear wait state;

wherein, when said connection management section is in the receiving-end clear wait state said connection management section is operable to:

designate as old data any data stored in said data temporary storage section when the transmitting-end clear request has been received;

select, as the write destination, a region in said data temporary storage section where the old data is not stored;

select, as the read source, a region in said data temporary storage section where the old data is stored while the old data is present; and select said empty data storage section as the read source once the old data is no longer present; and erase the old data if the receiving-end clear request is received when said connection management section is in the receiving-end clear wait state.

4. The stream data processing apparatus according to claim 1, wherein said transmitting-end processing section and said receiving-end processing section are operable to output the transmitting-end clear request and the receiving-end clear request, respectively, and perform transmission and reception of any data by using a data transmission section and a data reception section, respectively, which provides an accessing function to said connection management section.

5. The stream data processing apparatus according to claim 1, wherein said connection management section is operable to select, if any data transmitted from said transmitting-end processing section cannot be written to said data temporary storage section, whether to (i) perform a process of immediately notifying an error to said transmitting-end processing section, or (ii) perform a process of waiting until it becomes possible to write any data to said data temporary storage section and perform a process of notifying said transmitting-end processing section a result of writing any data to said data temporary storage section.

6. The stream data processing apparatus according to claim 1, wherein said connection management section is operable to select, if any data to be received by said receiving-end processing section cannot be read from said data temporary storage section, whether to (i) perform a process of immediately transmitting an error to said receiving-end processing section, or (ii) perform a process of waiting until it becomes possible to read any data from said data temporary storage section and perform a process of notifying said receiving-end processing section a result of reading any data from said data temporary storage section.

7. The stream data processing apparatus according to claim 1, further comprising a data input section for receiving the stream data as an input.

8. The stream data processing apparatus according to claim 7, wherein said data input section is operable to receive the input of the stream data from a removable recording medium.

9. The stream data processing apparatus according to claim 1, further comprising a data output section for outputting the stream of data as a result of performing the multiple processing steps.

10. The stream data processing apparatus according to claim 9, wherein said data output section is operable to output, to a removable recording medium, the result of performing the multiple processing steps.

11. The stream data processing apparatus according to claim 1, wherein said transmitting-end processing section and said receiving-end processing section are operable to output the transmitting-end clear request and the receiving-end clear request, respectively, independent of one another.

* * * * *